Nov. 16, 1926.  1,607,078
H. J. HAYS
GLASS MOLDING MACHINE
Filed March 1, 1924   4 Sheets-Sheet 4

Patented Nov. 16, 1926.

1,607,078

UNITED STATES PATENT OFFICE.

HARRY J. HAYS, OF WASHINGTON, DISTRICT OF COLUMBIA, ASSIGNOR TO REEVE HOOVER, TRUSTEE, OF WASHINGTON, DISTRICT OF COLUMBIA.

GLASS-MOLDING MACHINE.

Application filed March 1, 1924. Serial No. 696,212.

My present invention relates to the art of glass making and has particular reference to an improved type of mold and machine for the manufacture of sheet or plate glass.

An object of my invention is to provide an improved mold for use in molding sheet or plate glass, in which suction is utilized to draw the molten glass into the mold from the batch into which the said mold is immersed.

A further object of my invention is to provide an improved mold for making sheet or plate glass, in which a portion of the molten glass into which the mold is immersed is drawn into the mold by suction, and in which a part or side of the mold is relatively movable to press or force the glass into the entire mold cavity to completely fill the same to form the sheet or plate.

A further object of my invention is to provide an improved mold for use in molding sheet or plate glass, in which suction is utilized to draw the molten glass into the mold from the batch into which the mold is immersed, and in which novel means are provided for closing the bottom of the mold cavity and for cutting off and removing any surplus glass not required for the formation of the sheet or plate.

A further object of my invention is to provide an improved mold carrier for supporting a series of molds, and for successively presenting the molds above a batch of molten glass, and to provide means for immersing the separate molds into the batch; for charging the molds; for withdrawing the molds from the batch; and for finally discharging the sheets or plates from the molds after the glass has cooled.

A further object of my invention is to provide an improved molding machine for molding sheet or plate glass, combined with an improved glass melting furnace in which the glass is melted and kept in a state of constant agitation to continuously present a new batch of molten glass to the individual molds of the machine as the molds are separately and successively immersed therein.

A still further object of my invention is to provide a device of the above mentioned character that is automatic and continuous in operation, and which is relatively simple in construction, reliable in operation, and highly efficient in the purpose for which designed.

In the accompanying drawings forming a part of this specification, and in which like numerals are employed to designate like parts throughout the several views.

Figure 3 is a vertical sectional view of Figure 1, Figures 4 and 5 are enlarged plan and sectional views respectively of two of the molds at diametrically opposite sides of the machine, showing in detail their supporting and operating structure.

Figure 3:
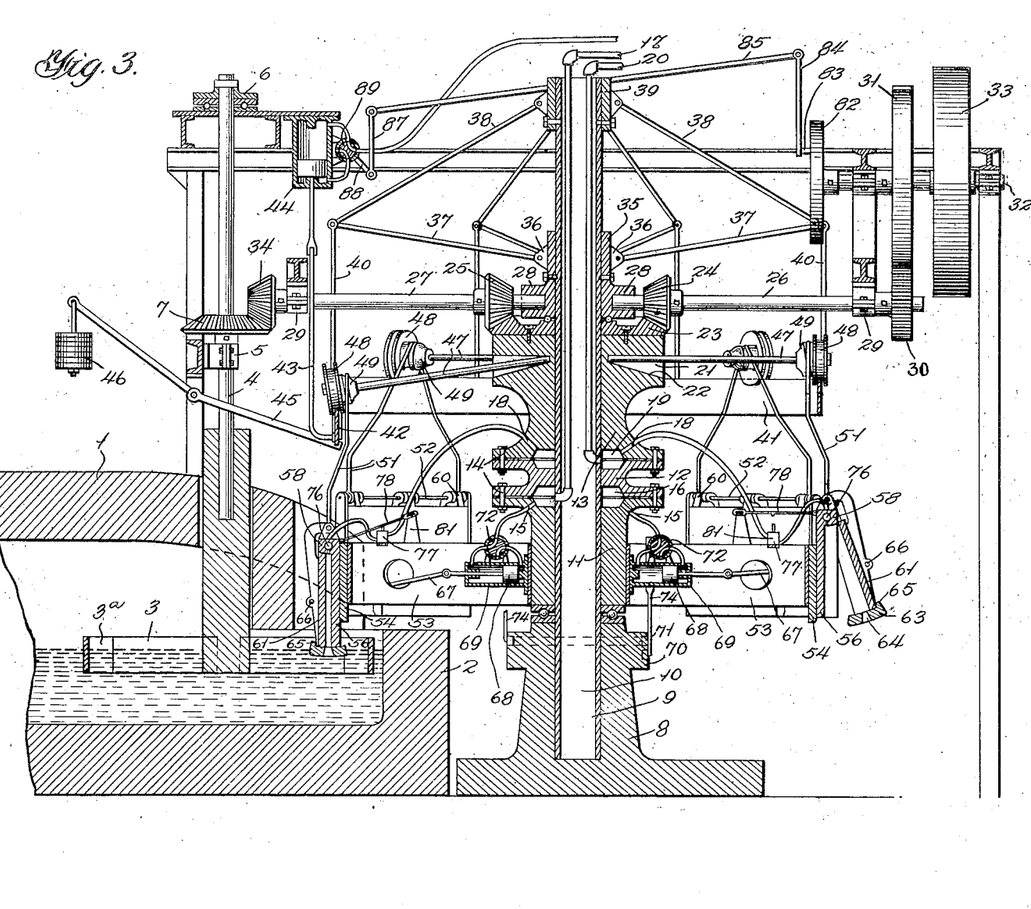

Referring to the drawings, wherein for the purpose of illustration is shown several preferred embodiments of the invention, the numeral 1 designates a portion of a glass pot or furnace having an open top forehearth or projection 2, said pot or furnace containing a batch of molten glass which is kept skimmed and in a state of constant agitation by a rotary paddle member 3, having an annular rim member 3ª, and supported at the lower end of the vertically extending drive shaft, 4, rotatably mounted in bearings 5 and 6, and driven, in a manner to be hereinafter explained, by a bevel gear 7. As will be readily seen from Fig. 3, the rim member 3ª is relatively wide and is only partly submerged within the batch of molten glass within the glass pot or furnace 1.

Figures 1, 2:
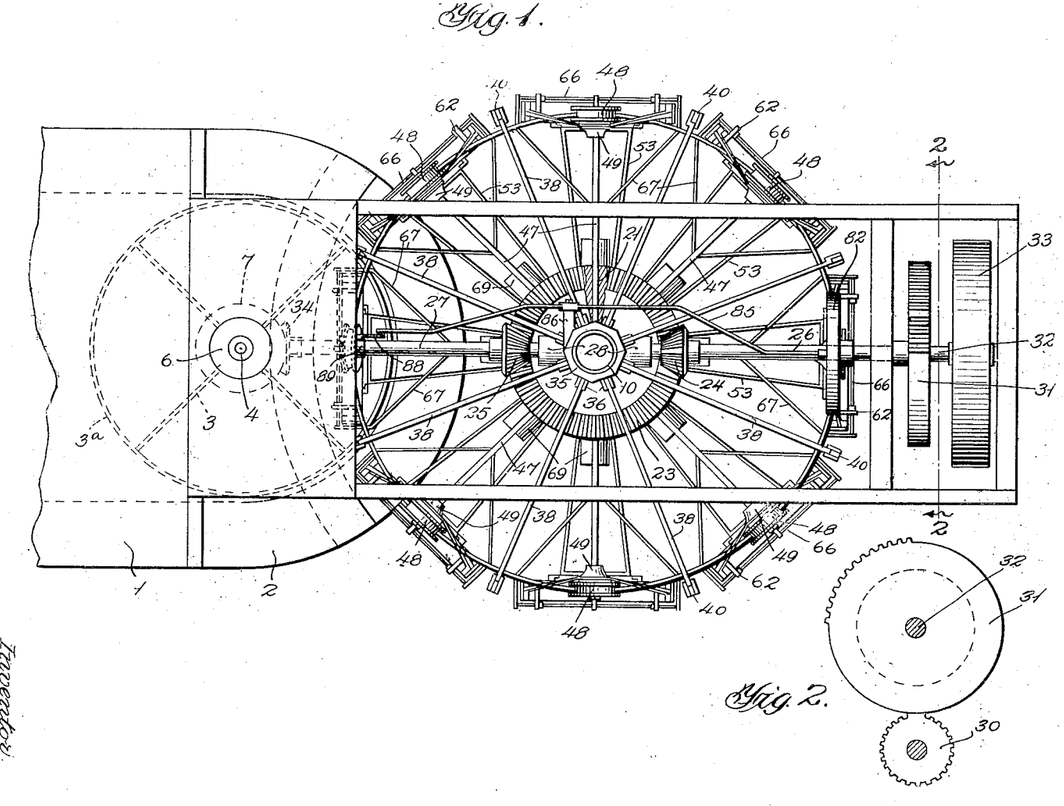
Figure 1 is a plan view of the machine, partly in section, and a portion of the glass furnace with which the machine is associated.
Figure 2 is a sectional view on the line 2—2 of Figure 1, showing the interrupted gear mechanism for intermittently advancing the molds successively to the forehearth of the glass furnace.

Located adjacent the forehearth 2, of the furnace 1 is a pedestal 8, having a vertical central opening 9, in which is positioned the vertically extending hollow shaft 10. Mounted upon the pedestal and surrounding the hollow shaft 10 are three sleeves 11, 12 and 13, detachably connected by suitable fastening bolts 14, and adapted to rotate about the shaft 10. The lower sleeve 11 is provided with a series of radial outlets 15 communicating with the annular passage 16, formed by adjacent annular depressions in the top of the sleeve 11 and the bottom of the sleeve 12 respectively. The annular passage 16 is connected through the supply pipe 17 to a suitable source of compressed air, for a purpose to be hereinafter described. The sleeve 13 is likewise provided with a series of radially extending outlet openings 18, communicating with the annular passage 19, formed by adjacent annular depressions in the top of the sleeve 12 and the bottom of the sleeve 13 respectively. The annular passage 19 is connected through the supply pipe 20 to a suitable vacuum or suction pump, for a purpose to be hereinafter described. The sleeve 13 is further provided with a series of radial openings 21, having downwardly and outwardly inclined bottom walls 22. Mounted upon upper end of the sleeve 13 and secured thereto, is a horizontal beveled gear wheel 23, meshing with the small beveled pinions 24 and 25, carried at the inner ends of shafts 26 and 27 respectively, journaled and supported in stationary bearings 28 and 29. The shaft 26 has secured to its outer end a small spur gear 30, meshing with a large spur gear 31, mounted on a stub shaft 32, each of said gears having interrupted gear teeth on their periphery, as clearly shown in Figure 2. Rotation of the shaft 32 is effected by a drive pulley 33, or any other suitable power means. To the outer end of the shaft 27, is secured a bevel pinion 34, meshing with the gear 7, secured to the vertical shaft 4.

Positioned above the bevel gear 23 on the shaft 10 is a stationary sleeve 35, carrying the bearings 28, above referred to, and having a series of radially extending ears 36 to which are connected the brace rods 37, the outer ends of which are connected to the supporting arms 38, secured at their upper ends to a stationary sleeve 39, mounted on the upper end of the shaft 10. To the outer connected ends of the brace rods 37 and supporting arms 38 are attached the depending arms 40, which support an annular track 41, concentric with the stationary shaft 10.

The section of the track 41 directly above the open top forehearth 2 of the glass pot or furnace 1, is provided with a vertically movable arcuate section 42, which is supported by a yoke 43, connected to the piston of a vertically arranged fluid pressure cylinder 44, which controls the vertical position of the said section 42. The arcuate section 42 is connected to the inner end of a pivoted lever 45, to the outer end of which is attached a weight 46 to constitute a counterweight for the movable track section to assist the fluid pressure cylinder 44 to raise the said track section and the apparatus supported thereon.

Inserted within each of the radial openings 21 in the sleeve 13 is a radially extending shaft 47, on the outer end of which is rotatably mounted a flanged wheel or roller 46, adapted to ride on the track 41. Secured on the shaft 47 directly behind the roller 48 is a stationary sleeve 49, provided on its periphery with a vertically inclined groove 50, as clearly shown in Fig. 7. Straddling the sleeve 49 and resting in the groove 50 thereon is a depending yoke 51, to the lower ends of which is secured a horizontal bar 52. Attached to the sleeve member 11 and adapted to rotate therewith, is a series of radially extending arms 53 to the outer ends of which are secured plates 54, having vertical end flanges 55 for a purpose to be hereinafter described.

Referring specifically to the preform of mold shown in Figures 3, 4, 5, 6 and 7, it will be seen that the same comprises a substantially rectangular back plate 56, provided with guide pieces 57 which engage the end flanges 55 of the plate 54. The top and sides of the back plate 56 are provided with the marginal outwardly extending flanges 58 and 59. The top flange 58 is provided with spaced upwardly-extending lugs 60 through which extends the supporting rod 52, whereby the mold is supported from the yoke 51. Co-acting with the outer face of the back plate 56 and fitting within the marginal flanges 58 and 59 is the front plate 61, provided on its outer surface with arms 62 pivotally mounted on the rod 52. The plates 56 and 61 have their inner adjacent faces maintained in parallel spaced relation to form between them a mold cavity of predetermined thickness.

Pivotally mounted on the rod 52 is a yoke 63 extending down the sides of the plate 56 and across the bottoms of the plates 56 and 61, and having an elongated opening 64 extending through its bottom portion through which the molten glass may be drawn into the mold cavity. The front edge of the bottom of the yoke 63 is provided with an upwardly extending flange 65, the purpose and function of which will be hereinafter described. For causing the front plate 61 to move away from the back plate, I pass a rod 66 through the arms 62, and connect the outer ends of this rod to the ends of a yoke 67. The inner end of the yoke is pivotally connected to the rod of a piston 68, adapted to reciprocate within a fluid pressure cylinder 69 mounted in horizontal position on the sleeve 11 between the arms 53. Located at the upper end of the pedestal 8 is formed an annular projection 70 provided on its periphery with a groove 71. The fluid pressure cylinder 69 has associated therewith a rotary valve 72 adapted to control the admission and exhaust of fluid pressure to and from the cylinder 69. Movement of this valve is affected by means of a gear 73, actuated by a vertically reciprocating rack 74, to the lower end of which is attached a roller 75, adapted to ride in the groove 71, the configuration of the said groove controlling the movement of the rack 74 and the consequent position of the valve 72.

For drawing the molten glass into the mold cavity of the above described mold, I provide a passage 76 through the flanges 58 and 59, having direct communication with the interior of the mold cavity. This passage 76 is connected through suitable pipes or tubing to a reciprocating valve 77, which is normally maintained in a closed position so that suction does not exist in the passage 76. Pivotally mounted on the rear of the back plate 56 is a valve operating rod 78, the inner end of which is provided with an elongated opening 79, through which extends a shaft 80, supported by suitable brackets 81, secured to the arms 53.

Mounted on the stub shaft 32 and adapted to rotate therewith is a disk 82, the outer face of which carries a projection 83, to which is swiveled the depending link 84 of a lever 85, pivotally mounted on a boss or projection 86 (see Fig. 1), carried on the stationary sleeve 39. The other end of the lever 85 has attached thereto a depending link 87, connected to the valve operating handle 88 of a rotary valve 89, which controls the vertical position and movement of the track section 42.

Figures 6, 7, 8, 9, 10:
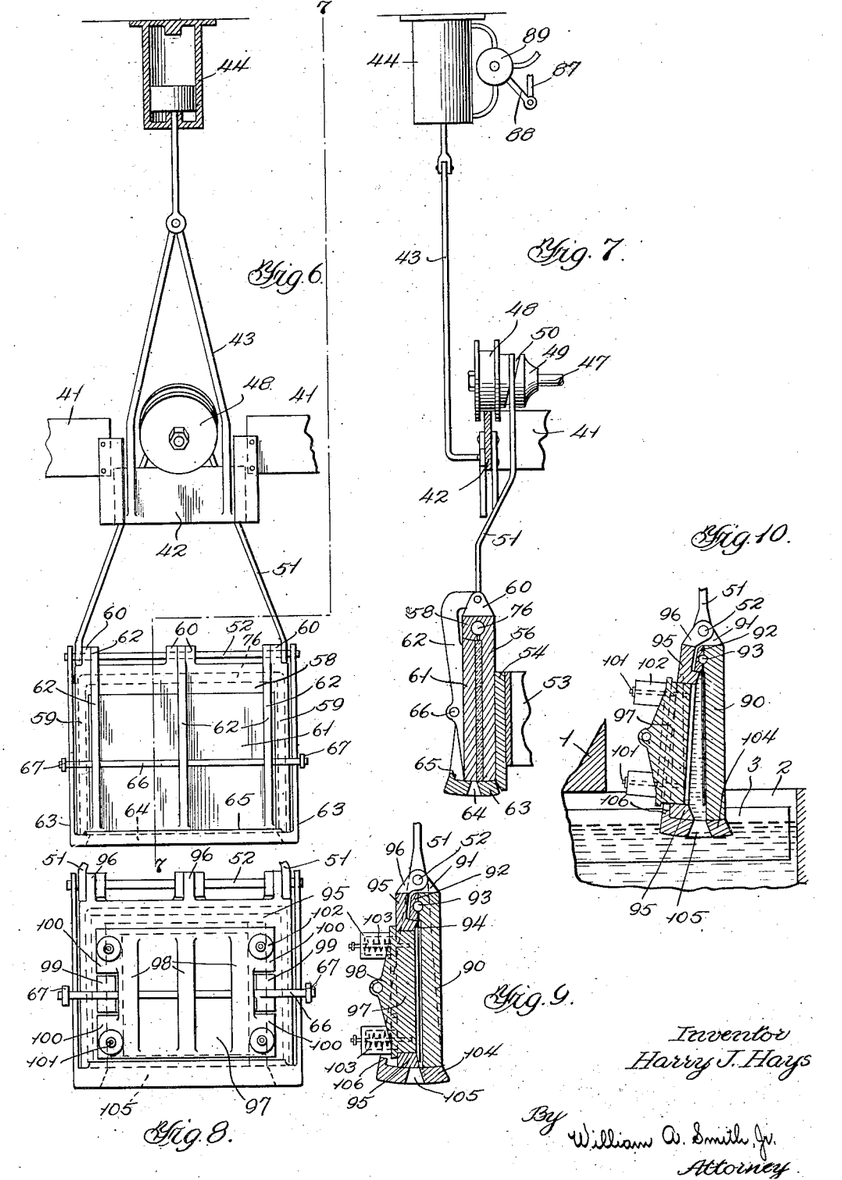
Figure 6 is an enlarged side elevation, partly in section, showing the means for effecting the vertical movement of the molds to immerse and withdraw the molds into and from the batch of molten glass in the associated glass furnace, the mold being shown in its lowermost position.
Figure 7 is a vertical end elevation, partly in section, on the line 7—7 of Figure 6, showing the mold in its raised position.
Figure 8 is a side elevation of a modified form of mold.
Figure 9 is a vertical sectional view of the same in closed position.
Figure 10 is a vertical sectional view of the same and a portion of the glass furnace, showing the position of the modified form of mold during the operation of charging the mold.

Referring to the modified form of mold shown in Figures 8, 9 and 10, it will be seen that the same comprises a back plate 90, the top edge of which is provided with upwardly extending lugs 91, through which pass the supporting rod 52, whereby the mold is supported from the yoke. On the front face of the back plate 90 is secured a strip 92, forming a marginal flange extending along the top and side edges of the plate, and through this strip and the adjacent face of the plate is formed the suction passage 93, corresponding to the passage 76 in the preferred form of mold above described. Co-acting with the front face of the back plate 90 is a front member 95 having the inwardly extending beveled flange 94 and having upwardly extending lugs 96, through which the rod 52 passes. The front member 95 is provided with a relatively large central opening into which is slidably mounted the front plate 97, provided on its outer surface with integral outwardly projecting ribs 98, through which the rod 66 passes, the said rod 66, having its outer ends connected to the ends of the yoke 67, actuated by the fluid pressure cylinder 69. The outer face of the front member 95 is provided with lugs 99 which act as guides during the sliding movement of the front plate 97 relative to the front member 95. The front plate 97 is provided with lateral end extensions 100 which are disposed above and below the lugs 99, and through apertures in the extension 100 are passed headed rods or bolts 101, the inner ends of which are screwed into the front member 95. Surrounding each rod 101 and secured to the extension 100, is a cup-shaped member 102, through the end of which the rod 101 is freely slidable and within which is located a coil compression spring 103 positioned about the rod 101. Pivotally mounted on the rod 52, is a yoke 104 extending down the sides of the members 90 and 95, and across the bottoms thereof, and having an elongated opening 105 extending through the bottom portion, through which the molten glass may be drawn into the mold cavity formed by the spaced faces of the back plate 90 and the members 95 and 97. The front edge of the bottom of the yoke 104 is provided with an upwardly extending flange 106, the purpose of which will be hereinafter described.

Figure 4:
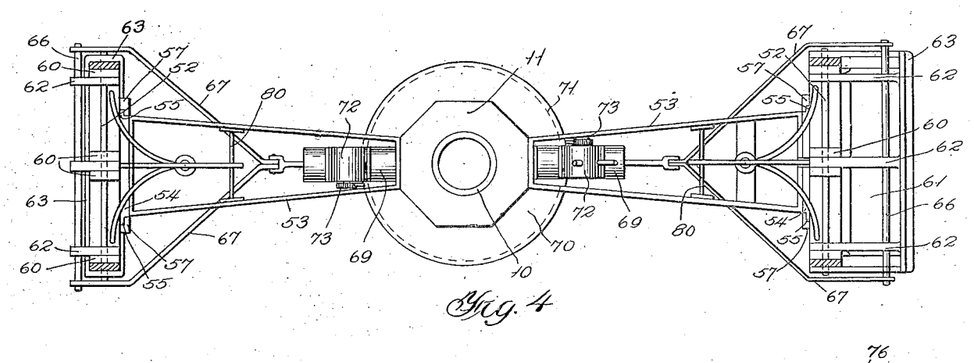
Figure 5:
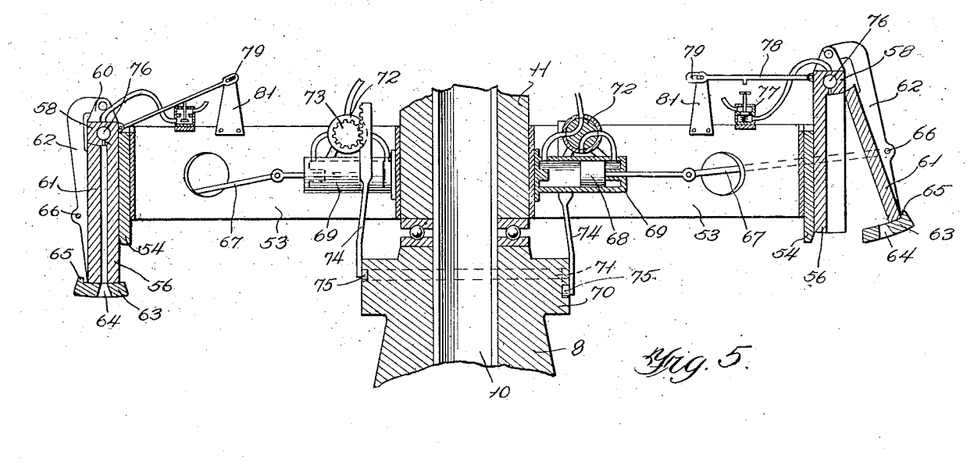

Referring to the operation of my improved mold and machine for the manufacture of sheet or plate glass, power is applied to the drive pulley 33 which imparts rotation to the gear 31 and disk 82 mounted on the stub-shaft 32. This rotation is transmitted to the spur gear 30, which, due to the interrupted gear teeth on the gears 31 and 30, causes intermittent rotation of the sleeves 11, 12 and 13 and the apparatus carried thereby, and also causes rotation of the skimmer or paddle 3, in the batch of molten glass contained in the glass pot or furnace 1. Due to the fact that the annular rim member 3a is only partly submerged within the batch of molten glass, the upper edge of the said rim member constitutes a barrier or wall which prevents the seeds, stria and other foreign matter or impurities which collect on the upper surface of the molten batch within the furnace, from flowing into the space inclosed within the said rim members between the skimmer or paddle members 3; hence the batches of glass successively presented to the open top fore-hearth 2 below the mold members, is relatively pure and free from the seed and stria or other impurities which would ordinarily collect on the surface of the batch in the forehearth were it not for the provision of the annular rim member 3ª. The utility and advantages of the annular rim member 3ª in the production of a plate or sheet free from flaws and imperfections is readily apparent to those skilled in the art. At the proper interval in the cycle of rotation of the machine, one of the rollers 48 and the mold carried on one of the shafts 47 is caused to rest on the vertically movable track section 42. At this instant, the rotation of the disk 82 acts through the pivoted levers 84, 85 and 87, and operates the rotary valve 89 to admit fluid pressure above the piston in the cylinder 44 to force the movable track section downwardly against the counterweight lever 45 and to immerse the mold into the batch of molten glass in the forehearth 2 of the glass pot or furnace 1, it being understood that immersion of the mold and the rotation of the paddle or skimmer members 3 and 3ª is so timed as to permit the mold to drop between the pairs of radial paddle arms 3 into the skimmed batch confined between the said paddle arms and that sector of the annular rim member extending between the outer ends thereof. The downward movement of the mold operates through the lever 78 to depress the valve stem of the valve 77, whereby suction is applied from the pipe 20 and the annular recess 19 to the passage 76, which suction draws or sucks in the molten glass through the opening 64 in the yoke 63 and into the mold cavity to completely fill the same. The further rotation of the disk 82 acting through levers 84, 85 and 87 then reverses the valve 89 and admits fluid pressure beneath the piston in the cylinder and permits the fluid above the piston to exhaust or discharge, thus lifting the yoke 43 and, with the aid of the counterweighted lever, lifting the track section 42 and the mold carried thereby. The upward movement of the mold acts through the lever 78 to permit the valve 77 to close, thus cutting off the suction previously existing in the passage 76. The upward movement of the mold also causes the lower inner edge of the yoke 63 to strike against the bottom of the plate 54, thus swinging the yoke outwardly about its pivot and causing the same to cut or shear off any surplus glass not required to form the sheet or plate and to close the bottom of the mold cavity, as clearly shown in Figure 7. The teeth on the gears 30 and 31 now mesh and the roller 48 and its shaft and the previously charged mold is caused to move off of the track section 42 and onto the track 41. The rotation of the sleeves 11, 12 and 13 then positions another roller 48 and the depending mold, on the track section 42, where the above described charging operation is repeated. This operation continues until the first mold reaches the position diametrically opposite the forehearth 2 of the furnace, 1. At this point in the cycle of operation, the roller 75 carried on the end of the rack 74 strikes a V-shaped dip in the annular groove 71 and the rack is moved downwardly thus causing the gear 73 to rotate the valve 72 to admit fluid pressure from the pipe 17 and annular recess 16 in front of the piston 68 in the cylinder 69 to move the yoke 67 outwardly. This movement of the yoke 67 acts through the rod 66 to swing the front plate 61 and the yoke 63 about their pivots to open the mold, as shown in Figures 4 and 5, to discharge the plate or sheet of glass previously formed in the mold. Continued rotation of the machine causes the roller carried by the rack 74 to ride out of the V-shaped dip in the annular groove 71, which movement reverses the valve 72 to admit fluid pressure behind the piston 68 and to discharge the fluid in front of the piston, thus drawing in the yoke 67 and closing the mold, the said mold remaining closed until the V-shaped dip in the groove 71 is again encountered. It is to be understood that the ratio of the gearing of the machine and the timing of the same, is such that during the time that one of the molds is immersed in the batch and during the time that one of the molds at the opposite side of the machine is discharging, the machine is not rotating, and that this pause in the cycle of rotation occurs successively as the rollers 48 and the individual mold members associated therewith reach the vertically movable track section 42, or the diametrically opposite discharge position. It is during this pause in the rotation that the valve 89 is actuated to lower and raise the mold into and from the batch, and also that the valve 72 is actuated to open the mold to discharge the cooled or formed plate or sheet from the mold.

Referring to the operation of the preferred form of mold shown in Figures 8, 9 and 10, it will be seen that in the operation of this type of mold, the mold is maintained in open position during the time that it is immersed in the batch. This open position of the mold during the charging operation is accomplished by providing a V-shaped dip in the annular groove 71 on the charging side of the machine. As the roller 75 carried on the lower end of the rack 74 strikes the second V-shaped dip, the valve 72 is actuated to force the yoke 67 outwardly and to open the mold and hold the same in open position during the time the mold is immersed in the batch and during the time that suction is admitted to the passage 93 through the valve 77 in the manner above described. The outward movement of the yoke 67 causes the front plate 97 to slide outwardly on the rods 101 until the springs 103 are compressed and then the front member 95 swings on its pivotal mounting on the rod 52 and the mold is opened for the purpose of charging or discharging. During the charging operation, the mold is maintained to open position, as clearly shown in Fig. 10, and the suction draws a batch of molten glass up through the opening 105 in the yoke 104 and into the mold cavity. After the mold raises, the roller 75 rides out of the V-shaped dip in the groove 71 and the valve 72 is reversed to move the piston 68 inwardly. During the operation of closing the mold after the suction has drawn a batch into the mold cavity, the front member 95 is first forced inwardly by the springs 103 and then the front plate 97 is drawn in by the yoke 67, thus causing the batch of molten glass to completely fill the cavity and to force or squeeze out any surplus glass not required for the formation of the sheet or plate. It will thus be seen that during the operation of charging the mold, the front plate and back plate are spaced apart to a greater extent than the width of the finished sheet or plate, and that upon the front and back plates coming together, the batch of molten glass just drawn from the forehearth into the mold cavity is compressed between the plates and caused to completely fill the entire mold cavity, the surplus not required for such filling being forced out through the inlet opening. This operation of charging the molds with the plates spaced apart and subsequently moving them together to compress the batch of glass between them to completely fill the cavity, constitutes an important feature of my invention. The upward movement of the mold causes the yoke 104 to engage the bottom edges of the plate 54, which swings the yoke about its pivot and causes the same to cut or shear off any surplus glass discharged from the mold cavity and to then close the bottom of the mold. It will be noted that the front member 95 is provided with the inwardly projecting beveled flange 94 and that in this embodiment of my improved mold the bevel extends completely around the front plate 95. This bevel may or may not be used depending upon whether or not a beveled plate or sheet is required.

It will thus be seen that I have provided an improved mold for the molding of sheet or sheet glass, in which the batch of molten glass is drawn by suction into the mold cavity of the required shape and dimensions; is allowed to cool or "set" in the mold; and is subsequently discharged from the mold, after which it may be passed to the tempering furnace or leer and then to a suitable grinding and polishing machine, such for example, as that shown in my copending application, Serial No. 685,000, filed January 8, 1924. It will be further seen that I have provided an improved mold carrier or support for intermittently and successively presenting the molds to the forehearth of an associated glass pot or furnace; for immersing the molds in the batch of molten glass; withdrawing the same from the batch; and for subsequently opening the molds to discharge the cooled and finished plate.

It is to be understood that the forms of my invention herein shown and described are to be taken as preferred examples of the same, and that various changes in the shape, size and arrangement of parts may be resorted to without departing from the spirit of my invention or the scope of the subjoined claims.

Having thus described my invention, I claim:—

1. A mold for molding sheets or plates, comprising a back plate and a front plate, said plates being spaced apart to form a mold cavity, suction means associated with the mold plates for drawing molten glass into the cavity between the plates, means for moving and maintaining the plates apart to a greater extent than the thickness of the finished sheet or plate to permit the ready entry of the glass into the mold cavity during the charging operation, means for moving the plates together after the charging of the mold cavity to compress the glass between the plates to completely fill the mold cavity, and means to move the plates apart to discharge the finished sheet or plate from the mold.

2. A mold for molding sheets or plates, comprising a back plate and a front plate, said plates being spaced apart to form a mold cavity having an inlet opening, suction means associated with the mold cavity for charging the same through the inlet opening, means for moving and maintaining the plates apart whereby the inlet is opened to a greater extent than the thickness of the finished sheet or plate to permit the ready entry of the glass into the mold cavity during the charging operation, means for closing the inlet opening, means for moving the plates together after the charging and inlet-closing operations to compress the glass between the plates to completely fill the mold cavity, and means to open the mold to discharge the finished sheet or plate therefrom.

3. A mold for molding sheets or plates, comprising a back plate and a front plate, said plates being spaced apart to form a mold cavity, suction means associated with the mold plates for drawing molten glass into the cavity between the plates, means for moving and maintaining the plates apart to a greater extent than the thickness of the finished sheet or plate to permit the ready entry of the glass into the mold cavity during the charging operation, means for moving the plates together after the charging operation to compress the glass between the plates to completely fill the mold cavity and to squeeze out any surplus glass not required for the production of the finished sheet or plate, and means to open the mold to discharge the finished sheet or plate therefrom.

4. A mold for molding sheets or plates, comprising a back plate; a relatively movable front plate spaced from the back plate to form a mold cavity, said mold cavity having an inlet opening; suction means associated with the mold for charging the mold cavity through the inlet opening; a pivoted yoke having an opening registering with the inlet opening in the mold cavity when the mold is being charged; means for moving the pivoted yoke to cause the opening therein to move away from the opening in the mold cavity to cut off any surplus material not required to fill the same and to also close the inlet opening; and means for moving the front plate and yoke to discharge the finished sheet or plate from the mold.

5. A mold for molding sheets or plates, comprising a substantially rectangular back plate having upwardly extending lugs at its upper edge; a substantially rectangular front plate spaced from the back plate to form a mold cavity having an inlet opening, said front plate having upwardly extending lugs along its upper edge; suction means associated with the mold for charging the mold cavity through the inlet opening; a supporting rod passing through the upwardly extending lugs of the front and back plates; a yoke pivotally mounted on the rod and closing the inlet opening after the mold has been charged; and means for moving the front plate and yoke about their pivotal mounting to discharge the finished sheet or plate from the mold.

6. A mold for molding sheets or plates, comprising a back plate, a front plate spaced from the back plate and having a cut out portion, a sliding front plate fitting within the opening in the said front plate and spaced from the back plate to form a mold cavity having an inlet opening, suction means associated with the mold cavity for charging the same through the inlet opening, and means for moving the front plates during the operation of charging and discharging the mold.

7. A mold for molding sheets or plates, comprising a stationary back plate, a pivotally mounted front plate spaced from the back plate and having a relatively large central cut out portion, a sliding front plate fitting within the opening in said pivoted front plate and spaced from the back plate to form a mold cavity having an inlet opening, suction means associated with the mold cavity for charging the same through the inlet opening, and means for first moving the sliding front plate and then the pivoted front plate during the operation of charging and discharging the mold.

8. A mold for molding sheets or plates, comprising a stationary back plate, a pivotally mounted front plate spaced from the back plate and having a relatively large central cut out portion, a sliding front plate fitting within the opening in said pivoted front plate and spaced from the back plate to form a mold cavity having an inlet opening, suction means associated with the mold cavity for charging the same through the inlet opening, and means to move the pivoted and sliding front plates away from the back plate during the charging of the mold and permitting the pivoted front plate to close and then the sliding front plate to close after the mold cavity has been filled to press the material in the mold.

9. A mold for molding sheets or plates, comprising a stationary back plate, a pivotally mounted front plate spaced from the back plate and having a relatively large central cut out portion, a sliding front plate fitting within the opening in said pivoted front plate and spaced from the back plate to form a mold cavity having an inlet opening, suction means associated with the mold cavity for charging the same through the inlet opening, resilient means connecting the sliding front plate to the pivoted front plate, and means for moving the sliding front plate within the cut out portion of the pivoted front plate against the tension of said resilient means and for subsequently moving the pivoted front plate during the operation of charging and discharging the mold.

10. A mold for molding sheets or plates, comprising a stationary back plate, a pivotally mounted front plate spaced from the back plate and having a relatively large central cut out portion, a sliding front plate fitting within the opening in said pivoted front plate and spaced from the back plate to form a mold cavity having an inlet opening, suction means associated with the mold cavity for charging the same through the inlet opening, resilient means connecting the sliding front plate to the pivoted front plate, and means for moving the pivoted front plate and the sliding front plate away from the stationary back plate to open the mold during the charging and discharging operation and for permitting the pivoted front plate to be closed by said resilient means prior to the closing of the sliding front plate during the closing of the mold.

11. A mold for molding sheets or plates, comprising a stationary back plate; a pivotally mounted front plate spaced from the back plate and having a relatively large central cut out portion, said front plate having inwardly extending beveled edges;

a sliding front plate fitting within the opening in the said pivoted front plate and spaced from the back plate to form a mold cavity having an inlet opening; suction means associated with the mold cavity for charging the same through the inlet opening to form a beveled edge sheet or plate; a movable member adapted to move across the inlet opening after the mold has been charged to cut off any surplus material not required to fill the mold cavity and also to close the inlet opening; means for opening the mold to permit the finished beveled edge sheet or plate to be discharged from the mold; and means for operating the said movable member.

12. In a glass molding machine, the combination of a glass pot or furnace having an open top forehearth, an annular track arranged adjacent the forehearth, molds adapted to travel on said track to successively position themselves above the forehearth, means for lowering and raising the molds into and from the batch of molten glass in the forehearth, and suction means associated with the molds and controlled by the vertical movement of the molds to charge the same during the time that the molds are immersed in the batch.

13. In a glass molding machine, the combination of a glass pot or furnace having an open top forehearth, a track arranged adjacent the forehearth and having a vertically movable track section directly above the forehearth, molds adapted to travel on said track and to rest on the vertically movable track section, means for lowering and raising the movable track section and the mold supported thereon to immerse and withdraw the mold into and from the batch of glass within the forehearth, and means for charging the molds from the batch during the time that the molds are immersed therein.

14. In a glass molding machine, the combination of a glass pot or furnace having an open top forehearth, an annular track arranged adjacent the forehearth and having a vertically movable arcuate track section directly above the forehearth, molds adapted to travel on said track and to rest on the vertically movable track section, a valve controlled fluid pressure cylinder connected to the movable track section, means for operating the valve of the fluid pressure cylinder to lower and raise the movable track section and the mold supported thereon to immerse and withdraw the mold into and from the batch of glass within the forehearth, and suction means associated with the mold and controlled by its vertical movement for charging the mold from the batch during the time that the mold is immersed therein.

15. In a glass molding machine, the combination of a glass pot or furnace having an open top forehearth, an annular track arranged adjacent the forehearth and having a vertically movable arcuate track section directly above the forehearth, a series of molds adapted to travel on said track, mechanism for intermittently and successively moving the molds onto said vertically movable track section, a valve-controlled fluid pressure cylinder connected to the movable track section, means associated with the mold moving mechanism for operating the valve of the fluid pressure cylinder to lower and raise the track section during the interval that the mold is supported thereon to immerse and withdraw the mold into and from the batch of glass within the forehearth, and means for charging the mold during the interval that the mold is immersed in the batch.

16. In a glass molding machine, the combination of a glass pot or furnace having an open top forehearth, a track arranged above said forehearth, molds supported on said track, drive mechanism for intermittently moving the molds along the track to successively position the same above the forehearth, means for immersing and withdrawing the molds into and from the batch during the time the mold pauses above the forehearth, suction means associated with the mold for charging the same, and means for opening the mold after its withdrawal from the batch to discharge the finished product from the mold.

17. In a glass molding machine, the combination of a glass pot or furnace, having an open top forehearth, a vertically arranged shaft positioned adjacent the forehearth, an annular track arranged above the forehearth concentric with the shaft and having a vertically movable section directly above the forehearth, a series of radial arms rotatably mounted on the shaft and having rollers on their outer ends adapted to ride on said track, depending molds carried on the radial shafts, means for causing the molds to be successively and intermittently positioned above the forehearth, and means for lowering and raising the vertically movable track section as the molds successively and intermittently rest thereon to immerse and withdraw the molds into and from the batch of glass in the forehearth.

18. In a glass pot or furnace, the combination of a glass agitating and skimming device, comprising a rotatable shaft, radial paddle arms secured to said shaft to cause a circulation of the batch within the pot or furnace, and a relatively wide annular rim member secured at the outer ends of said paddle arms and partly submerged into the batch of glass within the pot or furnace, the said rim member preventing the layer of impurities which normally collects upon the upper surface of the batch from entering the space inclosed within said rim member.

19. In a glass furnace comprising a main furnace portion and an open top forehearth projecting beyond said main portion to expose a surface of the glass, the combination of a glass agitating and skimming device, comprising a rotatable shaft, radial paddle arms secured to said shaft to cause a circulation of the batch within the main furnace and forehearth, and a relatively wide annular rim member secured at the outer ends of said paddle arms and partly submerged into the batch of glass within the main furnace and forehearth, the said rim member preventing the layer of impurities which normally collects on the upper surface of the batch from entering the space in the furnace and forehearth inclosed within said rim member.

In testimony whereof I hereunto affix my signature.

HARRY J. HAYS.